Figure 4:
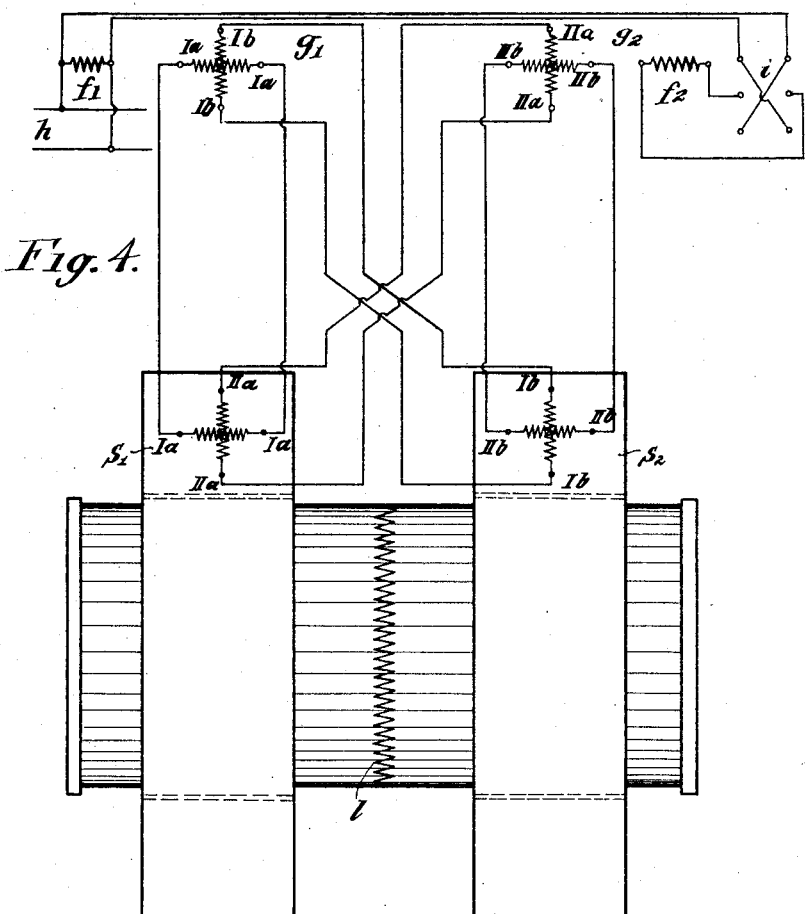

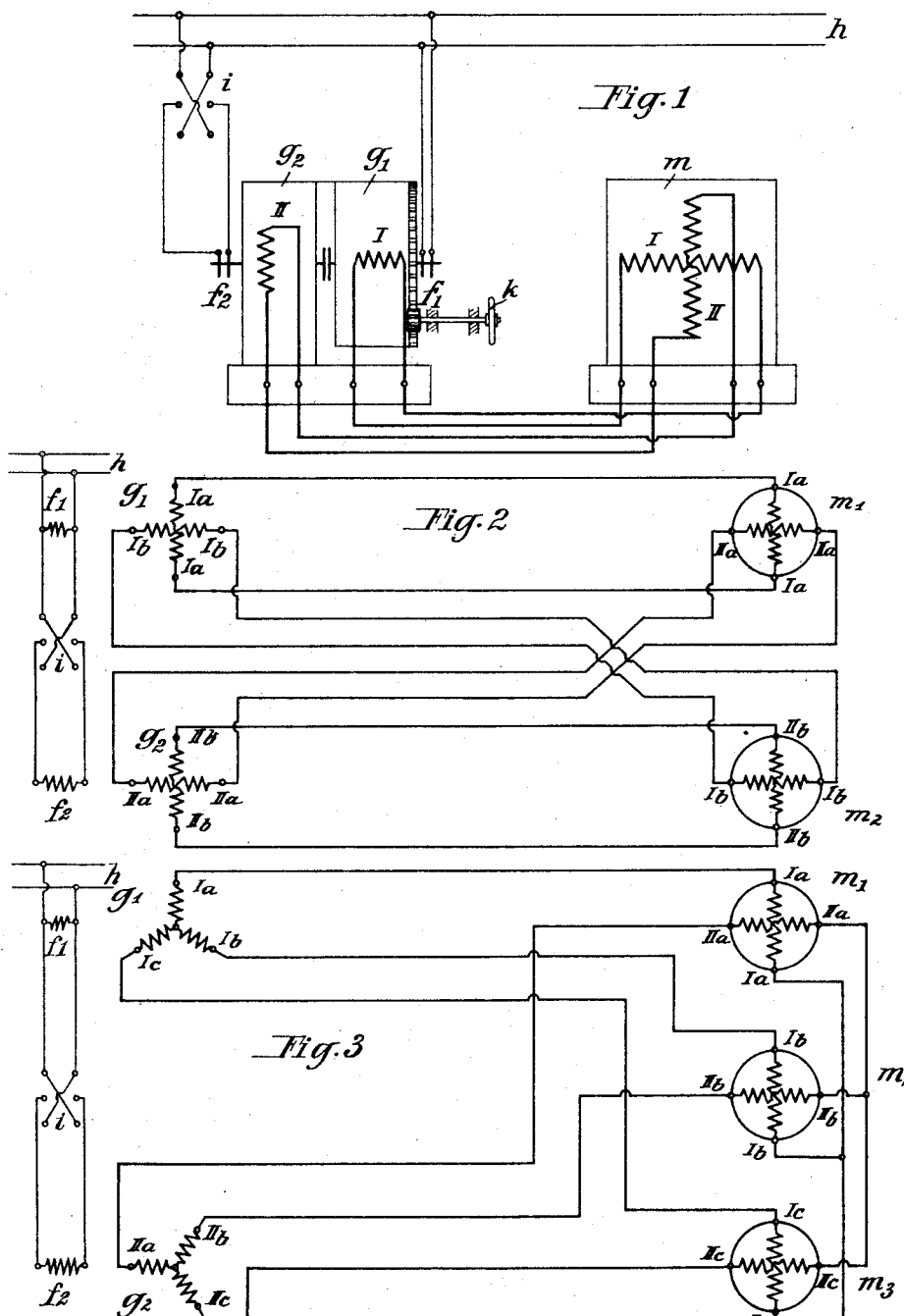

A. STAUCH.
SYSTEM OF ELECTRIC POWER TRANSMISSION.
APPLICATION FILED JAN. 9, 1915.

1,189,181.

Patented June 27, 1916.
2 SHEETS—SHEET 2.

UNITED STATES PATENT OFFICE.

ADOLF STAUCH, OF SPANDAU, NEAR BERLIN, GERMANY, ASSIGNOR TO SIEMENS SCHUCKERTWERKE, G. M. B. H., OF BERLIN, GERMANY, A CORPORATION OF GERMANY.

SYSTEM OF ELECTRIC POWER TRANSMISSION.

1,189,181.     Specification of Letters Patent.     Patented June 27, 1916.

Application filed January 9, 1915. Serial No. 1,431.

*To all whom it may concern:*

Be it known that I, ADOLF STAUCH, a German citizen, and resident of Spandau, near Berlin, Germany, have invented certain new and useful Improvements in Systems of Electric Power Transmission, of which the following is a specification.

This invention relates to a system of electric power transmission and more particularly to a transmission system having polyphase induction motors as motive members and individual single-phase or polyphase alternating current generators supplying the several phases of one and the same induction motor.

My invention has for its object primarily to provide an electrical transmission system for conveniently reversing the speed of an induction motor or of a plurality of induction motors without, however, employing any kind of switching apparatus which have heretofore been used in the power circuit for reversing the motor speed. According to my invention this is accomplished by providing individual generators for the several phases of the motor or motors and by properly reversing the exciting field of one of the generators, or in general by supplying the several motor phases by individual generator phases, whose phase positions or phase values may be so shifted with respect to each other that the succession of the several motor phases is reversed therewith changing the direction of rotation of the rotary field in the motor to travel in opposite direction.

In continuous current systems of electric power transmission for operating large motors at variable speed from a constant speed generator it is customary to effect the regulation of the speed and the reversal of the direction of rotation of the motor by varying or reversing the excitation of the generator, such as is for instance done in the Ward-Leonard system. Among other things a system of this kind possesses the advantage that the switching apparatus for effecting the control of the motor becomes small and convenient to handle. Beside this, the circuits in which switching is done will only carry currents of relatively small strength amounting only to a small part of the strength of the current flowing through the power circuits, that is through the circuits of the motor. Even if the exciter current of the main generator would have a value too large for operating switching apparatus in the exciter circuit it will be possible to effect the control of the motor within the exciter circuit of the exciter machine. Since in continuous current power transmission systems the voltage is limited to a value of about 750 volts or at most 1000 volts, for large powers to be transmitted very large current values will be obtained in the power circuit. Although with this system switching apparatus may be avoided in the power circuit by regulating or reversing the exciter circuit of the generator it will yet be necessary to employ brushes carrying the high amperage of the commutator circuit of the generator and the motor, which of course requires permanent supervision of the commutators and brushes for keeping the same in good condition.

While it is possible, as above pointed out, to control continuous current motors by switching outside of their power circuit, such as in the Ward-Leonard system, it has so far been impossible to reverse motors of the induction type without employing switching apparatus in the power circuit. The induction motor system according to my invention offers a successful solution of this problem, and in fact combines to a certain extent the advantages of a continuous current system with those of the induction motor system.

According to my invention the switching apparatus in the power circuit may be entirely avoided by feeding the several phases of the motor or motors to be controlled from an individual generator, while the control, that is the reversal of the motor is solely effected by changing the relative position of the phases of the generators. This phase changing may be accomplished in different manners; it may be done for instance by having the stators of the individual generators displaced in space against each other, or if two-phase motors are employed by reversing the field of one of the generators supplying one of the phases of the motor.

My invention will be more fully understood by reference to the accompanying drawings which show my present system of power transmission in general and a few modifications of the same.

Figure 5:
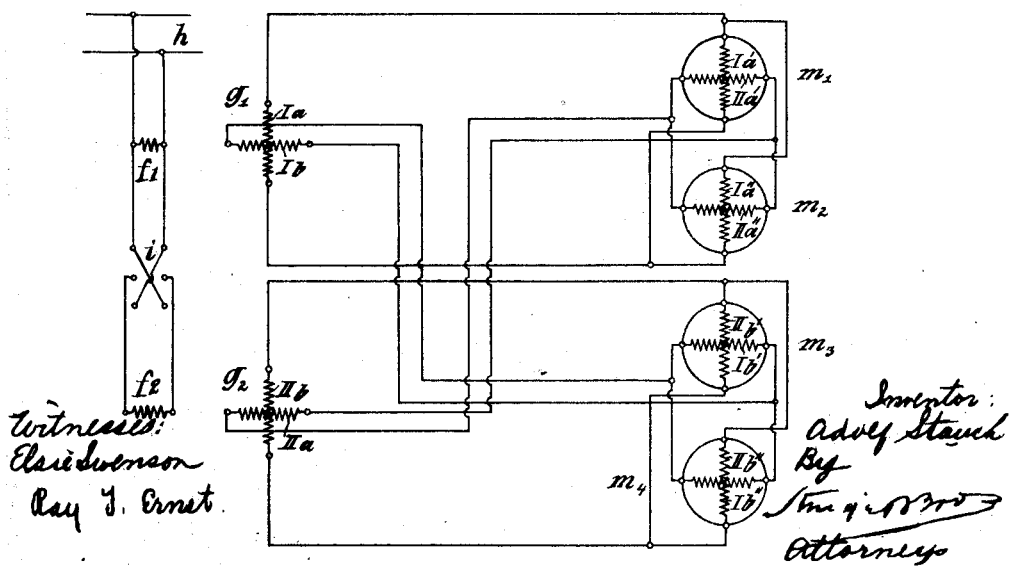

Figure 1 is a diagram showing a two-phase motor whose phases are each supplied by an individual single phase generator and whereby the reversed rotation of the rotary field on the motor is accomplished by reversing the exciter current of one of said generators. Fig. 2 is a system comprising two two-phase induction motors and two two-phase generators, which are connected according to my invention and Fig. 3 a similar system comprising three two-phase motors supplied by two three-phase generators. Fig. 4 is essentially the system shown in Fig. 2 with the difference that a twin-motor of the Boucherot type is used instead of the two individual motors of Fig. 2. Fig. 5 represents a further development of the principle shown in Fig. 2.

In Fig. 1 $m$ indicates the motor having two phases I and II. The phases of the motor are separately supplied each by a generator $g_1$ and $g_2$ respectively which generators are preferably immediately coupled with each other and united within a common casing. The exciter circuits $f_1$ and $f_2$ of the two generators $g_1$ and $g_2$ respectively are fed by the continuous current source $h$. Reversing of the motor $m$ is effected by reversing the current in the exciter circuit $f_2$ of the generator $g_2$, which may for instance be accomplished by the reversing switch $i$. Thus succession of the phases I and II in the motor $m$ will be changed and therewith the direction of rotation of the rotary field in said motor.

The system described in Fig. 1 in contradistinction to the Ward-Leonard system permits only a regulation of the motor speed to a very limited extent by a variation of the excitation of both generators and is therefore mainly suitable for such a service where the direction of rotation of the motor is frequently reversed and where a regulation of the speed within a large range is not required or can be accomplished in another way. Thus this system may be advantageously employed for driving ship's propellers as well as for driving certain planing machines, some kinds of reversible rolling mills and the like. If a plurality of motors shall be commonly controlled according to Fig. 1 the corresponding phases of different motors could be commonly fed by a single phase generator which arrangement, however, would be electrically objectionable. A more favorable arrangement is obtained if corresponding phases of the individual motors $m_1$ and $m_2$ are not fed each from a single phase generator but from the several phases of a polyphase generator, the advantage resulting from the fact that a polyphase generator is of much smaller size than a single phase generator. In the connections shown in Fig. 2 two two-phase motors $m_1$ and $m_2$ are shown having phases $I_a$, $II_a$ and $I_b$, $II_b$ respectively. These motors are fed from the two-phase generators $g_1$ and $g_2$ and more particularly the generator $g_1$ feeds with its one phase $I_a$ the phase $I_a$ of the motor $m_1$ and with its second phase $I_b$ the phase $I_b$ of the motor $m_2$. On the other hand the generator $g_2$ feeds with its phase $II_a$ the phase $II_a$ of the motor $m_2$ and with its phase $II_b$ the phase $II_b$ of the motor $m_2$. In this construction, the same as with that of Fig. 1 the direction of rotation of the fields of the motors may be reversed by reversing the excitation of one of the generators.

In the system shown in Fig. 3 two three-phase generators $g_1$ and $g_2$ will be required for driving three two-phase motors $m_1$, $m_2$ and $m_3$ according to my invention. If the two generators are mechanically coupled with each other, when erecting the same care must be taken that the two armature windings will be in proper relative position to each other. If in the example shown in Fig. 2 the exciter windings of the two generators $g_1$ and $g_2$ are in the same position in space, then the phase $I_a$ of the generators $g_1$ must coincide in space with the phase $II_b$ of the generator $g_2$, as diagrammatically indicated in the drawing. Likewise the phase $I_b$ must coincide with the phase $II_a$. In the system shown in Fig. 3 however the phases of the two generators are designated with $I_a$, $I_b$, $I_c$ and $II_a$, $II_b$, $II_c$, respectively, and corresponding phases are displaced relatively to each other by an angle of 90°. It is of course not necessary to effect the reversal of the motor or motors by reversing the field of one of the generators but obviously the same effect may be attained by arranging the armature windings, that is the stator of one of the generators, so that it may be rotated in space. This construction is indicated for the stator $g_1$ by the hand-wheel $k$ by means of which said stator may be rotated relatively to the stator $g_2$. For two-phase motors the stator $g_1$ must be displaced by 180 electrical degrees.

The number of the generators and the number of their phases in a system according to this invention is determined by the consideration that the first mentioned number is equal to the number of the motor phases, while the number of phases of a generator is determined by the number of motors. These relations, however, are not strictly necessary and it may be stated that it will be sufficient if the ratio between the number of the motor phases and the number of the generators is a whole number or a proper fraction or if such a number of motors is driven from the generators that the number of motors will be a multiple of the number of the generator phases. This case is represented in Fig. 5. Here four motors $m_1$, $m_2$, $m_3$ and $m_4$ are fed from two generators $g_1$ and $g_2$. Corresponding phase windings of the motors for instance $I_{a'}$ and $I_{a'''}$ furthermore $II_{a'}$ and $II_{a''}$ of the motors $m_1$ and $m_2$, furthermore $II_{b'}$ and $II_{b'''}$ also $I_{b'}$ and $I_{b'''}$ of the motors $m_3$ and $m_4$ are connected in parallel with each other and in a manner similar to the connections shown in Fig. 2, whereby the phase windings of the motors are connected to the proper phase windings of the generators. It is possible also to connect the phase windings of the motors $m_1$ and $m_2$ or $m_3$ and $m_4$ also in series or in case of another number of motors the phase windings thereof may be connected according to any desired combination.

The advantage of the arrangement whereby instead of the single phase generators according to Fig. 1 polyphase generators are employed can be eventually utilized in order to employ a plurality of commonly working motors instead of one motor supplied by a plurality of generators. An especially favorable connection is obtained if two such motors are united into a twin-motor of the Boucherot-type, which is shown in Fig. 4. The connections are the same as those of Fig. 2. The designations in Fig. 4 are the same as those in Fig. 2 with the addition of the letters $s_1$ and $s_2$ for the two stators of the Boucherot motor, which are fed from one group of generators in a like manner as this is represented in Fig. 2 for the motors $m_1$ and $m_2$. The bars of the rotor which is common to the two stators are connected in their middle part by conductors $l$ of high specific resistance as indicated in the drawing. In case of normal excitation of the two-phase generators the rotary fields which are generated in the stators $s_1$ and $s_2$ are identical in every respect and the rotor will in this case operate in the same manner as any other short-circuit rotor. If the phases of one generator now are changed by 180° which may be done by reversing the excitation or by a proper space displacement of the stator, the rotary fields generated in the stators $s_1$ and $s_2$ will have the same sense of rotation as in the case of Fig. 2 but will be displaced regarding their momentary phase-values by 180°. In other words these rotary fields are now so positioned relatively to each other, that poles of opposite polarity will act upon an individual rotor bar. Thus in each half of the rotor electro-motive forces will be generated which are opposed to each other in each individual rotor-bar and which therefore can equalize each other over the resistances $l$, so that in this case the motor will have the characteristics of an induction motor which is started with resistance in its secondary. Consequently a high starting torque will be developed, while the efficiency of the motor when in normal service will be slightly decreased. The arrangement of Fig. 4 has special advantages for driving ships' propellers, and for changing the direction of travel of the ship the switching maneuvers can be done quickly and conveniently. When traveling backward the efficiency of the motor system according to Fig. 4 will of course be reduced but this is of no importance whatever, since the backward travel takes place only during short times. On the other hand the forward travel of the ship is accomplished under normal and favorable operating conditions at a high efficiency of the motor.

Having thus described my invention I claim as new and desire to secure by Letters Patent of the United States:—

1. A system of electric power transmission comprising a plurality of generators having polyphase windings, and a plurality of motors having polyphase windings; the respective phase windings of each motor being supplied from phase windings of different generators, and each phase winding of each generator supplying but one motor phase winding.

2. A system of electric power transmission comprising a plurality of generators having polyphase windings, and a plurality of motors having polyphase windings; the respective phase windings of each motor being supplied from phase windings of different generators, and each phase winding of each generator supplying but one motor phase winding; the number of said generators being equal to the number of phases of a motor.

3. A system of electric power transmission comprising a plurality of generators having polyphase windings, and a plurality of motors having polyphase windings; the respective phase windings of each motor being supplied from phase windings of different generators, and each phase winding of each generator supplying but one motor phase winding, and means for varying the phase relations of said generators relatively to each other, for reversing the succession of the motor phases.

4. A system of electric power transmission, comprising a plurality of generators, a double motor having two stators and a short-circuit rotor with resistances inserted between the several bars thereof midway between said stators, a plurality of phase windings on each of said stators, a like plurality of polyphase generators each feeding a corresponding phase of said stators, and means for varying the phase values of said generators relatively to each other, whereby the succession of the motor phases is reversed.

In testimony whereof I have hereunto set my signature in the presence of two subscribing witnesses.

ADOLF STAUCH.

Witnesses:
HENRY HASPER,
WOLDEMAR HAUPT.